March 14, 1933.  L. E. WIRTH  1,901,686
COTTON HARVESTING MACHINE
Filed May 21, 1930  6 Sheets-Sheet 1
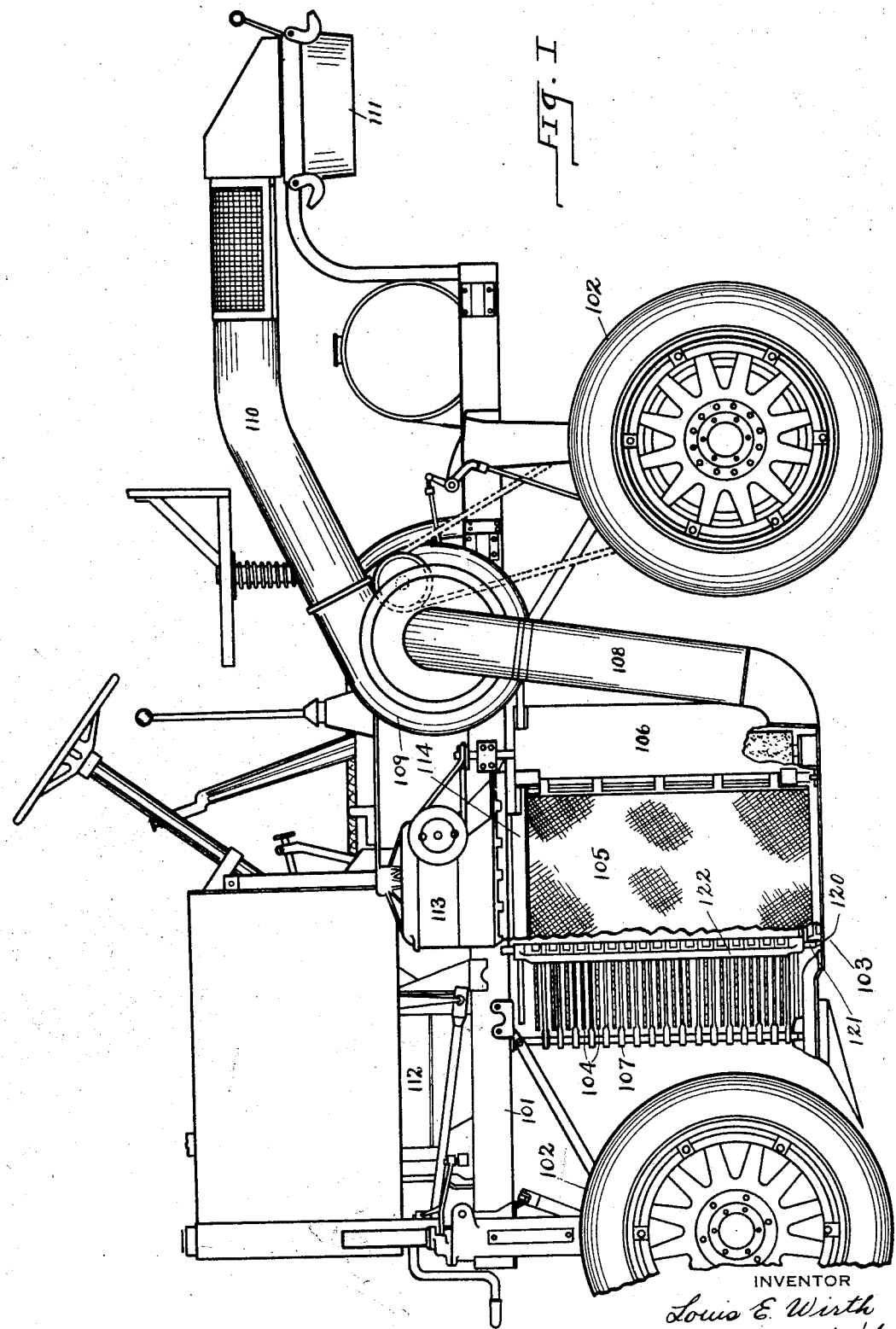
INVENTOR
Louis E. Wirth
by Christy Christy and Wharton
his attorneys

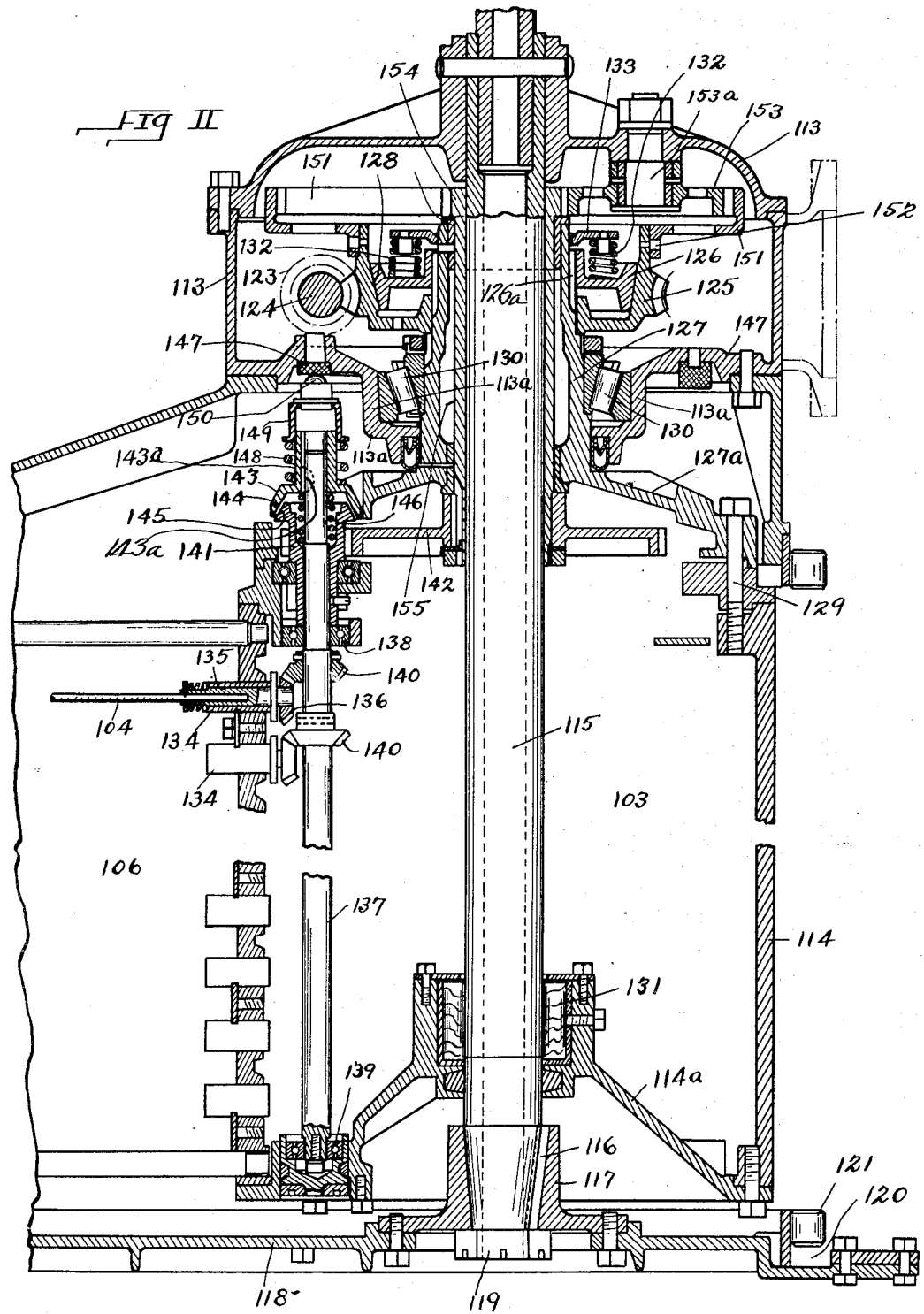

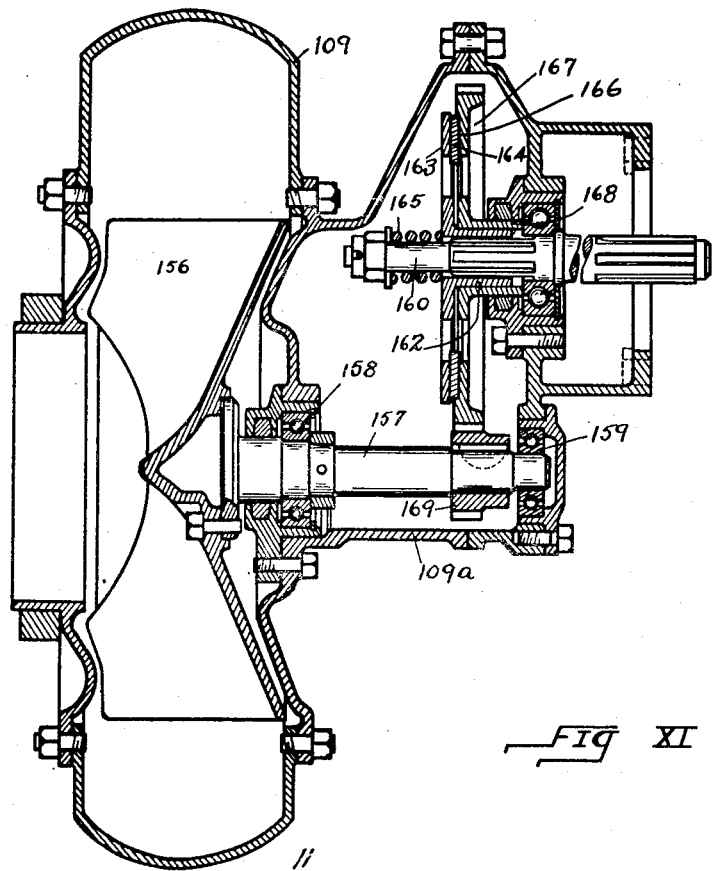
Fig XI
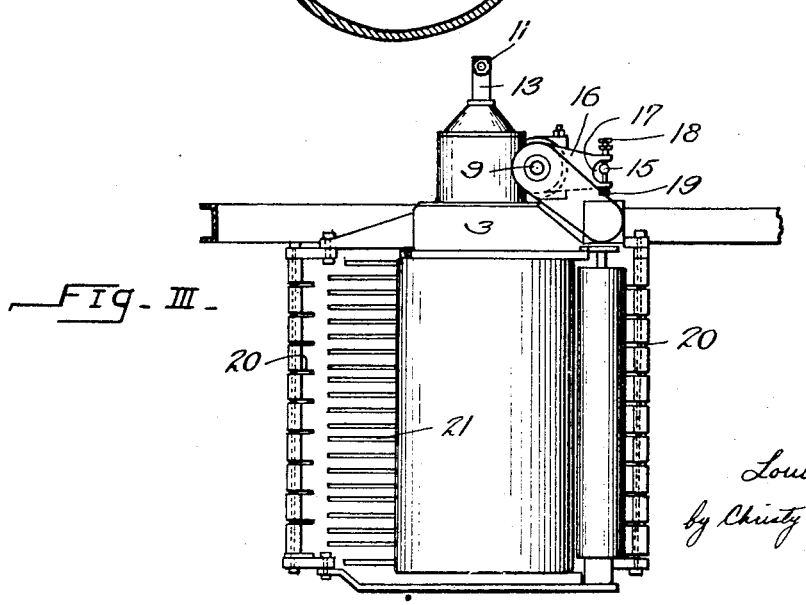
Fig III
INVENTOR
Louis E. Wirth
by Christy, Christy and Wharton
his attorneys

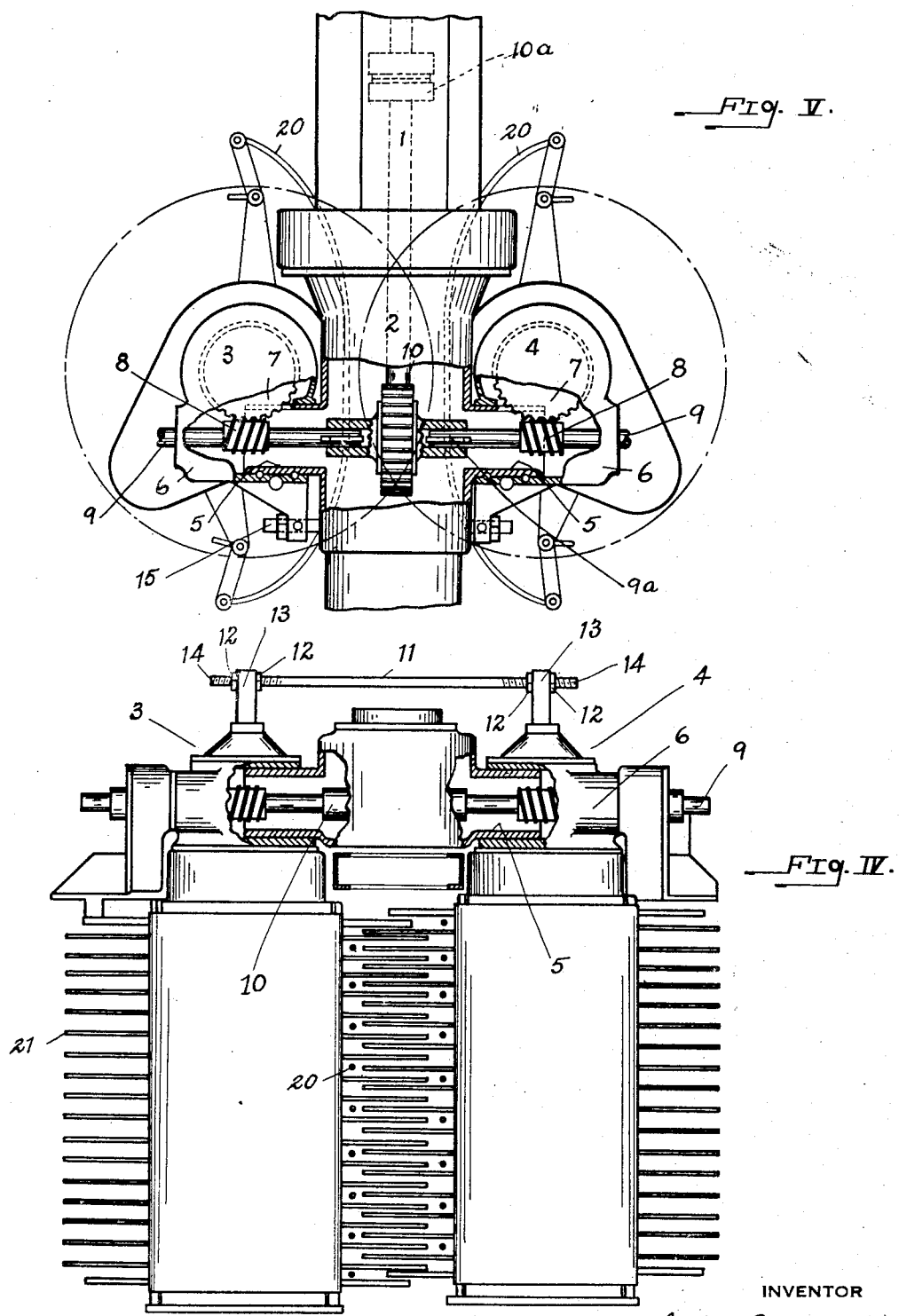

March 14, 1933.   L. E. WIRTH   1,901,686
COTTON HARVESTING MACHINE
Filed May 21, 1930   6 Sheets-Sheet 5
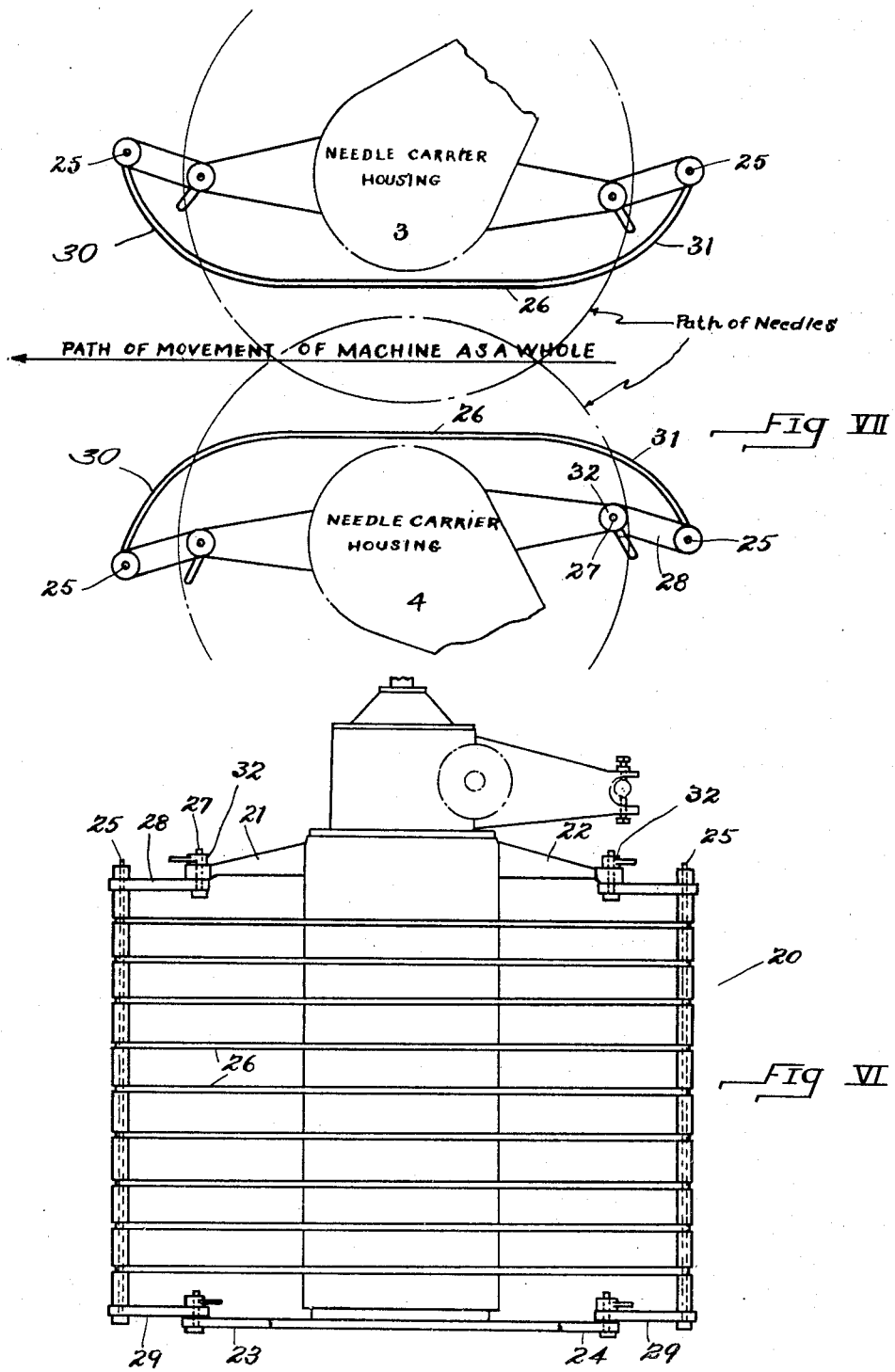
INVENTOR
Louis E Wirth
by Christy, Christy and Wharton
his attorneys

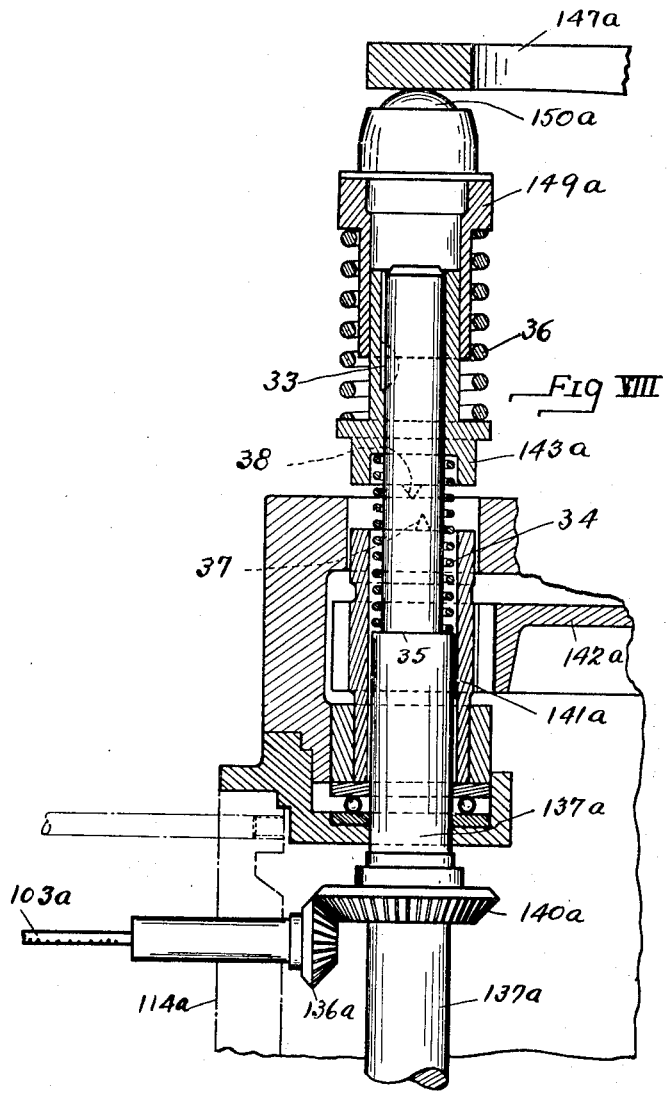
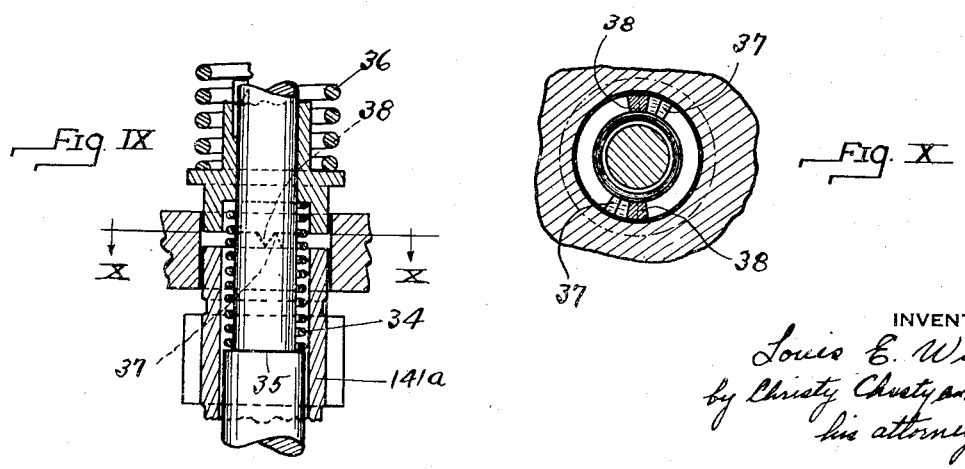

Patented Mar. 14, 1933

1,901,686

UNITED STATES PATENT OFFICE

LOUIS E. WIRTH, OF PITTSBURGH, PENNSYLVANIA, ASSIGNOR TO COTTON HARVESTER CORPORATION OF AMERICA, A CORPORATION OF DELAWARE

COTTON HARVESTING MACHINE

Application filed May 21, 1930. Serial No. 454,255.

This invention relates generally to cotton harvesting machinery, and relates more particularly to cotton-picking machines of the type disclosed in patents to Hiram N. Berry, No. 1,530,151, No. 1,599,313, No. 1,610,250, No. 1,635,151, No. 1,747,566, and No. 1,747,567.

As in the Berry patents noted, the cotton harvester of the present invention comprises two picking cylinders, which are suspended from a carriage and are mounted to rotate on vertical axes. These cylinders are provided with picking fingers or needles which project radially in spaced relation. Connections are provided within the cylinders to a source of motion, to rotate the picking needles about their own axes. The carriage is arranged on wheels, with a motor arranged for both propulsion and actuation of the picking cylinders and needles, and is adapted to progress along and straddle a row of cotton plants. The plants between the cylinders are subjected to the action of the rotating picking needles. To prevent a destructive effect upon the plants, the needle-carrying cylinders are geared to rotate inwardly with a circumferential velocity substantially equal to that of the linear velocity of the carriage. The picking needles project into the plants, and, gathering the cotton on their rotating stems, detach it from the plants. Suitable means such as stripper bars, arranged to move longitudinally of the needles, strip the cotton from the needles after they leave the plants, and fans are employed to draw and blow the free cotton into suitable containers mounted on the carriage.

The general object of my invention is to provide improved driving mechanism for the needle-carrying cylinders and the picking needles, and to secure improved performance by the apparatus as a whole.

A more specific object of my invention is to provide an improved mounting for the picking cylinder assemblies, so that the position of these assemblies with respect to the machine frame may be regulated in accordance with the growth of cotton which is to be harvested.

Another object of the invention is to mount on the needle carrier assemblies the grids which co-operate with the picking needles, so that the grids are primarily adjusted with the carriers, and to provide independent adjustment of the grids on the carrier assemblies.

Another object of the invention is to provide such driving connections that the picking needles are rotated at a high rate of speed.

Another object of the invention is to so mount and connect the picking needles that the rotation of the several vertical rows of needles is independently and positively effected, so that each row is independent of the other rows with respect to the period of its rotation during each single revolution of the carrying cylinder with which the rows are associated.

Another object of the invention is to provide an improved clutch in the immediate driving connections of the picking needles, and to provide improved means associated with the clutch for determining the period of rotation of each row of needles during a single complete revolution of the needle carrier.

A further object of my invention is to so arrange positive driving connections that they are wholly housed in such manner as to be wholly protected from injury and from such deterioration as would result from exposure to the weather; and in such manner as to prevent possibility of injury by such connections to the operator of the machine.

In the accompanying drawings Figure I is a side elevation of the harvesting machine of the present invention; Figure II is a vertical sectional view through one of the needle carrier assemblies, showing in detail the mechanism for operating the picking needles, and indicating the adjacent portions of the machine fragmentarily; Figure III is a side elevation of one of the picking needle carriers of the machine, illustrating a modified mounting of the needle carrier to permit angular adjustment thereof; Figure IV is a rear elevation of the two co-operating needle carriers, illustrating the adjustable mounting shown in Figure I, parts being broken away to show the driving connections; Figure V is a plan view of the assembly shown in Figure IV, parts being broken away in this figure also to illustrate the driving and adjusting connections for the carriers; Figure VI is a side elevation similar to Figure III, but showing in detail the grid associated with the needle carrier; Figure VII is a view showing two needle carriers diagrammatically, and illustrating the mounting of the grids thereon; Figure VIII is a vertical sectional view through a modified form of clutch mechanism in the immediate driving connections for the picking needles, and showing the elements of the clutch in disengaged position; Figure IX is a fragmentary vertical section showing the clutch elements in engaged position; Figure X is a cross-sectional view taken on the line X—X of Figure IX; and Figure XI is a vertical sectional view through the cotton conveying fan of the machine and its operating connections.

The form of the device shown in Figures I and II of the drawings does not involve the feature of adjusting the picking needle carrier assemblies, nor the special clutch illustrated in Figures VIII to X inclusive of the drawings.

With reference to Figures I and II of the drawings the machine comprises a carriage frame 101, suitably mounted on wheels 102. Mounted beneath the machine frame 101 in mutual alignment transversely of the machine are two needle carrier assemblies 103, arranged to carry and operate the picking needles 104. The general assembly comprises a screen 105, a chamber 106 for the collection of cotton carried by the needles, and a grid structure 107, which is mounted on the machine frame 101 to co-operate with the picking needles 104.

Cotton detached from the needles in chamber 106 is drawn therefrom through conduit 108 by means of a fan in housing 109, and passes through a second conduit 110 to an outlet 111 to which may be connected a suitable receptacle for receiving the cotton.

From the motor 112 suitable connections are made to the driving means for the needle carrying assemblies, certain of such connections for revolving the needle carriers and rotating the needles being within the housing 113 of each of the cylinders. It is highly desirable that the power transmitting means within the needle carrier assembly be compact so that they may be wholly housed within housing 113 and within cylinder 114 constituting the needle carrier proper. It is also highly desirable that these connections be such as to produce a high speed of rotation of the picking needles.

The needle carrier 114 is revolubly mounted about a vertical shaft 115, which has a key engagement 116 with a socket 117 on a plate 118. A nut 119 fixes the shaft to the socket. Plate 118 is wholly supported by its connection with shaft 119, and serves in turn to support one of the tracks 120 for the cam rollers 121 of stripper bars 122 (Fig. I). The other cam track 120 is carried by the housing 113.

The initial driving connection to each needle carrying assembly comprises a worm 123, on a driving shaft 124 and meshing with an annular worm gear 125. It is to be understood that shaft 124 is rotated by connection with the motor of the machine. Within annular worm gear 125 is a clutch 126 keyed by key 126a to a tubular driving member and carrier support 127. Clutch 126 has a tapering surface to normally seat against correspondingly tapered surface 128 of the gear 125.

Tubular member 127 has an outflaring base 127a, which is secured by bolts 129 to the cylinder, or needle carrier proper, 114. Desirably roller bearings 130 are interposed between tubular member 127 and the lower wall 113a of housing 113. Also roller bearings 131 may be desirably provided between shaft 115 and the lower bracket portion 114a of cylinder 114.

In order that revolution of cylinder 114 may be transmitted through clutch 126, a plurality of springs 132 are spaced concentrically on the vertical immovable plate 133 to bear against clutch member 126 and maintain it in close frictional engagement with annular worm gear 125. In normal operation, revolution of annular worm gear 125 thus produces revolution of cylinder 114. If, however, cylinder 114 should by any means be held against revolution, worm gear 125 will slip on clutch member 126, so that the clutch does not serve to transmit rotary movement to frame member 127 and cylinder 114.

Picking needles 104 are mounted in the cylinder, or needle carrier proper, 114 in vertical rows, and are so connected for actuation that each row is rotated independently throughout a portion of each single revolution of the cylinder 114, the connections being such as to secure a relatively high speed of rotation of the picking needles of each row being actuated. Each of the picking needles 104 is mounted in a bearing 134 in the cylinder wall, and within each of said bearings is a journal member 135 carrying a bevel gear 136. Extending vertically in alignment with each vertical row of bearings 134 is a shaft 137, which is revoluble in bearings 138 and 139. Fixed to each such shaft are bevel gears 140 meshing with bevel gears 136 on the row of picking needle journals with which the shaft is associated.

Freely mounted on the upper portion of shaft 137 is a gear 141 meshing with a driving gear 142.

Means for securing intermittent rotation of each of the shafts 137 comprise a clutch member 143 which is keyed by means of a key 143a to the shaft and is vertically slidable thereon. This clutch member 143 has a tapering surface 144 to frictionally engage surface 145 on the gear 141 which is normally free on shaft 137. A spring 146 surrounds shaft 137 and exerts a force tending to prevent frictional engagement of surfaces 144 and 145, and thereby prevent operative fixation of gear 142 to shaft 137. Rotation of gear 142 thus normally serves merely to rotate gear 141 idly, without producing revolution of shaft 137.

Means for securing revolution of each of the shafts 137 during a portion of each single revolution of cylinder 114 comprise a circular cam track 147 mounted on the base portion 113a of housing 113. Pressed upwardly by spring 148 is a cam rider 149 carrying a contact ball 150 which lies against cam track 147. Spring 148 surrounds a tubular portion 143a of clutch member 143. Cam track 147 is provided with a suitably positioned high portion, which causes the cam rider 149 to be pressed downwardly against the resistance of spring 148, and force clutch member 143 into close frictional engagement with gear 141. Since clutch member 143 is keyed to shaft 137, gear 141 is thus operatively connected with the shaft to rotate the same under the actuation of driving gear 142 during the period when the contact ball 150 rides the high portion of cam track 147.

Gear 142, which acts on gears 141, and is in constant mesh therewith, is driven from annular worm gear 125 by means of concentrically arranged operating connections. These operating connections comprise an internal ring gear 151, which is fixed at 152 to worm gear 125 to rotate therewith. Mounted in the upper wall of housing 113, and arranged to mesh with internal ring gear 151 is a pinion 153 meshing with a gear 154 rigidly fixed to a sleeve 155 which surrounds shaft 115 and lies within the tubular frame member 127. To this sleeve 155 driving gear 142 is rigidly connected.

It should be understood that, if desired, the driving gear may be stationary. In such arrangement the gears 141 are none the less in constant mesh with gear 142, and are actuated solely by revolution of needle carrier 114. In such case, however, simplicity of structure is obtained at a sacrifice of high speed of rotation of the needles.

The above described operating connections are compact, and are so arranged that they may be wholly housed within housing 113 and cylinder 114. As the rotation of driving gear 142 is opposite in sense to the direction of revolution of cylinder 114, which carries the shafts 137, and as gear 142 may be made of relatively great size with respect to gear 141 a high speed of revolution of picking needles 103 is obtained. The driving gear 142, concentric with central shaft 115 and cylinder 114, permits the driving of a plurality of needle actuating shafts by engagement with this gear; so that the gears 141 on each of the shafts 137 may be continuously actuated, and the period of revolution of the cylinder during which each of these shafts 137 is rotated, may be wholly controlled by the cam track 147.

Within housing 109 is mounted the fan 156 for drawing the cotton from the region in which it is detached from the picking needles, and delivering it to suitable containers. Fan 156 is actuated directly by means of shaft 157 having bearings 158 and 159 in housing 109a attached to housing 109. In housing 109a is a driving shaft 160, which may be connected for actuation with a moving part of the machine.

The connections between driving shaft 160 and fan shaft 157 comprise a driving member, which has a tubular portion 162 surrounding and keyed to driving shaft 160 and a disk portion 163. A coil spring 165, exerts a force tending to press the face of clutch portion 163 into driving contact with the face 166 of a gear 167, which has a tubular portion 168 surrounding the tubular portion 162 of the clutch member. A disk 164 lies free between the adjacent faces 163 and 167. Gear 167 meshes with pinion 169 on fan shaft 157 to actuate the fan shaft and fan.

It is to be understood that coil spring 165 exerts a force sufficient to cause the rotation of gear 167 if no added resistance is offered to such rotation, but insufficient to rotate gear 167 if there be an added resistance to its rotation. If therefore cotton, or a foreign object, should become so packed or jammed in the interior of housing 109 as to materially impede rotation of fan 156, the face of disk portion 163 will rotate idly with respect to the face 166 of gear 167, and will not tend to cause injury to the fan or operating connections by forcing rotation of the fan and its operating connections against such resistance. Disk 164, being free to move relatively to both disk 163 and face 166 of gear 167, prevents such binding as might cause any substantial driving tendency of gear 167 when movement of fan 156 is obstructed. The tendency to slippage is increased at all times by the presence of free disk 164.

A modified form of needle carrier and grid mounting is illustrated in Figures III to VII inclusive of the drawings. In the drawings the reference numeral 1 designates the machine frame, and reference numeral 2 a housing extending longitudinally of the frame and containing the actuating connections for rotating the needle carrier. The carrier housings are designated by the reference numerals 3 and 4. Extending oppositely outward from the housing 2 are tubular portions 5, which serve as journals for mounting the carrier housings 3 and 4, the tubular portions 5 being surrounded by the tubular mounting portions 6 of the carrier housings.

The means for transmitting movement to the needle carriers within the housings comprise worm gears 7, which mesh with worms 8 on short transverse shafts 9, having their bearings in the carrier housings. Rotation of shafts 9 is produced by means of a gear 10, having a keyed telescoping engagement 9a with the shafts 9. It is to be understood that the connections within the carrier housings, and needle carrying cylinders are generally similar to those shown in Figures I and II of the drawings. Desirably, however, worm gears 7 are rigidly attached to the succeeding driving connections without the interposition of clutch members. Suitable clutch mechanism 10a may be included in the connections between the motor of the machine and the gear 10.

The carrier housings 3 and 4 may be relatively adjusted transversely of the machine, to increase or decrease the interval therebetween. To effect this adjustment it is merely necessary to slide one or both of the carrier housings on the tubular housing portions 5. The carrier housings are mutually connected by means of a transverse bar 11. This connection comprises nuts 12, bearing against caps 13 on the housing, and threaded to oppositely threaded portions 14 on the bar 11. This rigid interconnection permits the two housings to be angularly adjusted as a unit. Since the actuating connections immediately associated with the carriers are disposed interiorly of the trunnion portions 5 of the fixed housing, the carrier housings may be rotated about these trunnions without disturbing the connections.

The needle carrier housings 3 and 4 are held in angularly adjusted position, about trunnions 5, by means of a rod or bar 15 mounted in the fixed housing 2. An arm 16 formed integral with, or rigidly connected to, the tubular mounting portion of each of the carrier housings has on the outer extremity thereof a yoke 17 embracing the rod 15. Set screws 18 and 19 passing through each of the arms of yoke 17 are arranged to bear against the rod 15, and thereby prevent movement of rotation of the carrier housings about their trunnions, and fix the angular position of the housings.

Grids 20 mounted on each of the carriers, and arranged to co-operate with the picking needles thereon, are mounted on the carrier housings to maintain the same position relatively thereto irrespective of the angular adjustment of the carrier housings.

As shown in Figures VI and VII of the drawings, reference numerals 3 and 4 designate, respectively, the two housings for the needle carriers, the path of the needles projecting from said housing being indicated in dotted lines, Figure VII. Each of the housings is provided with upper brackets 21 and 22 and lower brackets 23 and 24, for mounting the grids 20.

Each of the grids 20 comprises a pair of vertical rods 25, having mounted thereon horizontally extending bars 26, which are curved toward each of their ends and have a substantially straight central portion.

Each of the grid-supporting brackets 21 and 22 is pivotally connected by means of a pin 27 with a link 28 which embraces one of the rods 25 of the grid. The lower brackets 23 and 24 are pivotally connected with the rods 25 by means of links 29. Because of this mounting the grids 20 may be swung to adjusted position. The interval between their curved forward portions 30 may be increased or decreased, and the interval between their curved rearward portions 31 may be likewise adjusted. The forward portions of the grids are those which are disposed forwardly of the machine and which are the first to contact the bushes from which cotton is to be harvested. It is these which gather in the bushes in preparation for their presentation to the picking needles as the machine progresses.

In threaded engagement with each of pins 27 is a set screw 32, arranged to bear against the portion of the link 28 which surrounds the pin. When the grid has been adjusted to its desired position, movement of the grid is prevented by tightening these set screws 32 against the upper surfaces of the links 28.

When two picking needle assemblies are each provided with grids so mounted, a great variety of relative adjustments is possible, by swinging the grids into various positions relatively to each other, and to their associated housings. The shape of the passage for gathering in, compressing, and releasing the cotton bushes can thus be adjusted to suit the growth in the area which is to be harvested; that is, to the size and shape of the bushes. Being supported wholly from the housings of the needle carriers, without attachment to the frame on which said housings are mounted, adjustment of the housings in the frame does not affect the relative position of the grids and their associated housings; and the grids may be themselves adjusted on the housings to accommodate for relative transverse adjustment of the needle carrier assemblies.

It should be understood that the clutch mechanism associated with each of the shafts 137, which are mounted in needle carrier 114, and transmit movement of rotation to needles 103, serves as a safety device as well as producing the timed rotation of the needles. Thus if any needle of any one of the vertical rows should become so jammed, as by penetration of a portion of a cotton plant into its bearings, as to prevent rotation of the needle, there will be a slippage between the clutch member 143 and its associated gear. Rotation of shaft 137 associated with the needles of that row will therefore cease, and breakage of the parts will be avoided. It is highly desirable, however, that the clutch mechanism be rapid and positive in its operation, so that the rotation of shaft 137 is produced at the desired instant during each single revolution of the needle carrier. A modified form of clutch, particularly designed to fulfill both of these requirements is shown in Figures VIII to X inclusive of the drawings. In Figure VIII of the drawings, reference numeral 114a designates the needle carrying cylinder in which is mounted the needle operating shaft 137a. The needles 103a, one of which is shown, have at their inner ends bevel gears 136a meshing with gears 140a on shaft 137a.

A gear 141a is freely mounted to rotate on shaft 137a, and meshes with driving gear 142a, corresponding to the driving gear 142 shown in Figure II of the drawings. Gear 141a is thus normally rotated idly by gear 142a without producing rotation of shaft 137a. Clutch member 143a is keyed to shaft 137a at 33, and is vertically slidable thereon. A coil spring 34 seated on a shoulder 35 on shaft 137a exerts a force tending to separate gear 141a and clutch 143a. Slidable on clutch member 143a is a cam rider 149a carrying a contact ball 150a which lies against cam track 147a similar to cam track 147 shown in Figure II of the drawings. A coil spring 36 exerts a force tending to move clutch member 143a and cam rod 149a in opposite directions with respect to shaft 137a.

On the upper edge of gear 141a are a pair of teeth 37 which have inclined faces. On the lower edge of clutch 143a are similar teeth 38 arranged to co-operate with the teeth 37 on gear member 141a.

As previously described in connection with Figure II of the drawings, cam track 147a has a high portion which acts upon cam rider 149a. This produces engagement of clutch member 143a with gear 141a. In this engagement cam rider 149a compresses spring 36 and causes clutch member 143a to move downwardly against the resistance of coil spring 34 until such movement is stopped by contact of the edges of teeth 38 with the upper edge of gear 141a.

It is to be understood that gear 141a is continuously rotated by its meshing engagement with driving gear 142a. During a single revolution of this gear 141a, therefore, the teeth 38 on the clutch member become engaged with the clutch teeth 37 on the gear. As at the same time clutch member 143a is moving downwardly, there is a sliding movement of the co-operating teeth 38 and 37, until they are in mutually engaged position with their inclined faces in full contact. An abrupt engagement, such as might injure the edges of the clutch teeth 38 or 37, is prevented by the resilient mounting of the clutch member 143a with respect to the cam rider 149a as well as with respect to gear 141a. While the engaging action of the clutch is thus rapid, it is yieldingly effected, so that the teeth 38 and 37 slide smoothly into their engaged position. With the clutch teeth 37 and 38 in mutual engagement, any increased loading of the clutch tends to render the engagement more firm, up to the limit of strength of coil spring 34. When that limit is passed clutch member 143a and gear 141a are disengaged irrespective of the position of contact ball 150a on cam track 147a.

When contact ball 150a has passed the high region on cam track 147a clutch member 143a moves upwardly. This disengagement is rapid, as spring 36 co-operates with spring 34 in disengaging the members. Because of the resilient mounting of the clutch member disengagement also is effected smoothly during continued rotation of gear 141a.

The clutch teeth 38 and 37 are shown with their faces formed on an angle of 30 degrees to the perpendicular. This angle gives a positive engagement between the teeth 37 and 38, while permitting ready disengagement during rotation of the gear 141a. While the face angle of the clutch teeth may be varied, it is desirably less than 45 degrees to the perpendicular, as I have found that a face angle of 45 degrees or more does not afford an adequate engagement between the clutch teeth, and consequently between the clutch member and gear.

The present application is in part a continuation of my co-pending application Serial No. 414,501, filed December 16, 1929. As in that application, the operating connections for both the needle carrier and the needles are so formed and arranged that they are wholly housed within the housing and needle carrier cylinder of each needle carrying assembly. All such connections are of the gear rather than the chain type, thus securing positive actuation of the mechanism with constantly meshed gears; and are provided with suitable clutch mechanism to prevent destruction of the connections because of the jamming of any element or elements thereof. This general feature is of great importance in the manufacture of an efficient and durable cotton harvesting machine, because of the conditions of its use which involve rough handling and exposure to the elements, and which require a positive action in order that the machine may operate efficiently. Further, all the operating gears of the needle carrying assemblies are in constant mesh; thus insuring positive actuation and a long life for the actuating mechanism.

The positive rotation of each several row of picking needles independently of the other rows is of importance in that it permits the exact timing of the period during a single revolution of the needle carrying cylinder throughout which each row of needles is rotated. A full picking effect of the needles may thus be obtained, while causing an abrupt termination of their movement of rotation to permit their associated stripper bars to remove from them cotton which they have gathered. The positive clutch mechanism associated in the needle operating assembly also assists in the accurate timing of needle rotation, as well as providing a safety feature. The adjustment of the needle carrier assemblies with respect to the machine frame, and the adjustment of the grids for the picking needles with respect to the housings and cylinder of each assembly, enables the machine to operate on plants of various sizes and shapes to secure a complete stripping of the cotton therefrom. It also enables the operator of the machine to avoid injury to the plants which would result from an excessive crowding while they are subjected to the action of the picking needles; thus avoiding the inclusion of a great quantity of twigs and leaves with the cotton picked.

I claim as my invention:

1. In a cotton harvester the combination of a revolubly mounted needle carrier, a tubular carrier supporting structure rigidly connected with said carrier and concentric with the axis of revolution thereof, driving means, and means attached to said tubular carrier supporting structure yieldingly engaging said driving means for revolving the carrier.

2. In a cotton harvester the combination of a revoluble needle carrier, a tubular carrier supporting structure rigidly connected with said carrier and concentric with the axis of revolution thereof, driving means, means attached to said tubular carrier supporting structure yieldingly engaging said driving means for revolving the carrier, picking needles rotatably mounted in rows in said needle carrier, a separate engaging clutch associated with each individual row of picking needles, geared connections with said driving means operatively controlled by said clutches for rotating said rows of picking needles, and an engaging cam arranged to act on said clutches to operatively complete the actuating connections of each individual row of picking needles during a portion of each single revolution of the needle carrier.

3. In a cotton harvesting machine the combination of a fixed shaft, a carrier for picking needles revoluble on said shaft, a master gear, a driving connection concentric with said shaft for revolving said needle carrier from said master gear, picking needles rotatably mounted in said carrier, operating connections associated with said needles, and an actuating gear concentric with the shaft and operatively connected with the master gear arranged to actuate the operating connections for the picking needles.

4. In a cotton harvesting machine the combination of a fixed shaft, a carrier for picking needles revoluble on said shaft, a master gear, a driving connection concentric with said shaft for revolving said needle carrier from said master gear, picking needles rotatably mounted in said carrier, operating connections associated with said needles, an actuating gear concentric with the shaft and operatively connected with the master gear arranged to actuate the operating connections for the picking needles, and means for rendering said needle operating connections effective to rotate the needles during a portion of each single revolution of the carrier.

5. In a cotton harvesting machine the combination of a fixed shaft, a carrier for picking needles revoluble on said shaft, a master gear, a driving connection concentric with said shaft for revolving said carrier from said master gear, picking needles rotatably mounted in said carrier, an actuating gear concentric with said shaft and rotated by connection with said master gear, driving shafts in said carrier and geared to said picking needles, gears normally free on said shafts and in constant mesh with said actuating gear, clutch mechanism arranged to operatively connect each of said gears to the shaft on which it is mounted, and means mounted adjacent the needle carrier in constant contact with and arranged to act on said clutch mechanism to produce such operative connection of each gear with its shaft during a portion of each single revolution of the needle carrier.

6. In a cotton harvester the combination of a housing, a needle carrying cylinder mounted for revolution adjacent said housing, picking needles mounted in rows in said carrying cylinder and rotatable therein, a gear in said housing for revolving said cylinder, and operating connections between said picking needles and the gear for revolving the cylinder comprising an internally toothed ring gear rigidly connected with the cylinder revolving gear and an idler gear mounted on the wall of said housing and meshing with said ring gear.

7. In a cotton harvester the combination of a housing, a fixed shaft connected with the housing, a needle carrying cylinder revolubly mounted on said shaft, picking needles mounted in rows in said carrying cylinder and rotatable therein, a gear in said housing for revolving said cylinder, and operating connections between said picking needles and the gear for revolving the cylinder comprising an internally toothed ring gear rigidly connected with the cylinder revolving gear, an idler gear mounted in the wall of said housing and meshing with said ring gear, and a gear structure having an intermediate tubular portion surrounding said fixed shaft, an upper toothed portion meshing with said idler gear, and a lower toothed portion.

8. In a harvesting machine the combination of a machine frame, a transversely disposed trunnion, and a needle carrier assembly swingingly and slidably mounted on said trunnion for angular adjustment and for adjustment transversely of the machine frame.

9. In a harvesting machine the combination of oppositely extending hollow trunnions fixed to the machine frame, driving connections within said trunnions, a needle carrier assembly swingingly mounted on each of said trunnions and transversely adjustable thereon toward and from each other, and a transverse tie bar adjustably interconnecting the two needle carrier assemblies.

10. A grid assembly for use in harvesting machines comprising a housing for a picking needle carrier, a grid, and links pivotally connecting said grid adjacent the ends thereof with said housing and arranged to support said grid in adjusted position relatively to the housing.

11. In a harvesting machine the combination of a machine frame with a needle carrier assembly swingingly adjustable on said frame, a grid, and links pivotally connecting said grid adjacent the ends thereof with said needle carrier assembly and arranged to support the grid in adjusted position relatively thereto.

12. In a harvesting machine the combination of a machine frame with transverse mounting members, two needle carrier assemblies slidably mounted on said members for adjustment transversely of the machine frame, a grid associated with each needle carrier assembly, and links pivotally connecting each said grid adjacent the ends thereof with its associated needle carrier assembly and arranged to support the grid in adjusted position relatively thereto.

13. In a harvesting machine the combination of a machine frame with transverse mounting members, two needle carrier assemblies freely suspended and slidable on said mounting members for adjustment transversely of the machine frame and angularly adjustable with respect to said frame in a vertical plane extending longitudinally of the machine frame, a grid associated with each needle carrier assembly, and links pivotally connecting each said grid adjacent the ends thereof with its associated needle carrier assembly and arranged to support the grid in adjusted position relatively thereto.

14. In a cotton harvesting machine the combination of a revoluble needle carrier, picking needles rotatably mounted in said carrier, a shaft rotatably mounted in said needle carrier and geared to said needles for rotating the same, a gear normally free on said shaft, inclined clutch teeth on said gear coming to an edge outwardly of the gear face, and a clutch member slidably keyed on the shaft and having similar inclined teeth arranged to co-operate with the inclined teeth on the gear.

15. In a cotton harvesting machine the combination of a revoluble needle carrier, picking needles rotatably mounted in said carrier, a shaft rotatably mounted in said needle carrier and geared to said needles for rotating the same, a gear normally free on said shaft, inclined clutch teeth on said gear coming to an edge outwardly of the gear face, a clutch member slidably keyed on the shaft and having similar inclined teeth arranged to co-operate with the inclined clutch teeth on the gear, yielding means exerting a force tending to separate said gear and said clutch member and means concentric with the axis of revolution of the needle carrier arranged to act on said clutch member against the resistance of said yielding means to force the same into engagement with said gear during a portion of each single revolution of the needle carrier.

16. In a cotton harvester the combination of a revolubly mounted needle carrier, driving means for revolving said carrier, picking needles rotatably mounted in said carrier in vertical rows, vertical shafts each providing an actuating connection for each vertical row of needles, separate clutch mechanism associated with each individual shaft for operatively connecting each one of said shafts individually with the driving means for revolving the carrier; said clutch mechanism comprising a gear free to revolve on the shaft, clutch teeth having inclined faces on an edge of said gear coming to an edge outwardly of the gear face, a clutch member slidably keyed to said shaft, and teeth having similar inclined faces on an edge of said clutch member arranged to co-operate with the inclined teeth on said gear, yielding means exerting a force tending to separate said gear and said clutch member; and a cam concentric with the axis of revolution of the carrier, said cam being arranged to act on the clutch mechanism of each shaft against the resistance of said yielding means to produce rotation of each shaft during a portion of each revolution of the carrier.

17. In a cotton harvester the combination of a revolubly mounted carrier, revolving means for revolving said carrier, picking means rotatably mounted in said carrier in vertical rows, vertical shafts each providing an actuating connection for each vertical row of needles, clutch mechanism operatively connecting each of said shafts with the driving means for revolving the carrier; said clutch mechanism comprising a gear free to revolve on said shaft, clutch teeth having inclined faces on an edge of said gear, a clutch member having inclined clutch teeth and slidably keyed to said shaft, a cam rider slidable on said clutch member, resilient means exerting a force tending to separate said clutch member and said gear, resilient means exerting a force tending to separate said clutch member and said cam rider; and a cam concentric with the axis of revolution of the carrier, said cam being arranged to act on the clutch mechanism of each shaft to produce rotation of each shaft during a portion of each revolution of the carrier.

18. In a cotton harvesting machine the combination of a revoluble needle carrier, picking needles rotatably mounted in said carrier, a shaft rotatably mounted in said needle carrier and geared to said needles for rotating the same, a gear normally free on said shaft, inclined clutch teeth on said gear, a clutch member slidably keyed on the shaft and having inclined teeth arranged to co-operate with the inclined teeth on said gear, a cam rider slidable on said clutch member, resilient means exerting a force tending to separate said clutch member and said gear, and resilient means exerting a force tending to separate said clutch member and said cam rider.

19. In a cotton harvester the combination of a housing, a needle carrier revolubly mounted in said housing, picking needles rotatably mounted in said cylinder in vertical rows, vertical shafts rotatably mounted in the cylinder and each providing an actuating connection for each vertical row of picking needles, driving connections within said housing and said cylinder for revolving the cylinder and rotating the vertical shafts for actuating the picking needles, a circular cam concentric with the axis of revolution of the carrier, clutch mechanism for operatively connecting each of said shafts with the driving means which revolve the carrier and in constant contact with the circular cam during revolution of the carrier, said cam being arranged to act on the clutch mechanism of each shaft during a portion of each single revolution of the carrier for engaging the shaft to produce rotation thereof during that portion of the carrier revolution.

20. In a cotton harvester the combination of a machine frame, a cap housing carried from said frame, a needle-carrying cylinder rotatably mounted on the cap housing and having its upper end housed thereby, picking needles mounted in rows in said needle-carrying cylinder and rotatable therein, power-transmitting means and cylinder-revolving gearing mounted and housed in said cap housing, and gear connections for rotating the picking needles in said needle-carrying cylinder and actuated by the cylinder-revolving gearing, all of said gearing being wholly contained within the cap housing and the needle-carrying cylinder.

21. In a cotton harvester the combination of a revolubly-mounted needle carrier, driving means for revolving said carrier, picking needles rotatably mounted in said carrier in vertical rows, vertical shafts each providing an actuating connection for each vertical row of needles, individual driving connections to constantly operating means yieldingly associated with each one of the shafts, and a circular cam concentric with the axis of revolution of the carrier and in constant contact with said yieldingly mounted driving connections, said cam acting positively to determine the position of said driving connections at all times and to force the driving connections of each one of the shafts consecutively into engagement with its shaft with consequent rotation of the needles with which each said shaft is associated during a portion of each revolution of the carrier.

22. In a harvesting machine the combination of hollow trunnions extending oppositely transversely of the machine frame, driving connections within said trunnions, needle-carrier assemblies slidably mounted for reciprocable independent movement on said trunnions, said needle-carrier assemblies each comprising actuating mechanism operatively engaging with the driving connections in said trunnions.

23. In a harvesting machine the combination of hollow trunnions extending oppositely transversely of the machine frame, needle-carrier assemblies slidably mounted for reciprocable independent movement on said trunnions and each comprising independent actuating mechanism, a common driving member for the actuating mechanism of both needle-carrier assemblies and a driving shaft for the actuating mechanism of each assembly having a telescoping connection with said common driving member.

24. In a harvesting machine the combination of a machine frame, a hollow trunnion extending transversely outward from the longitudinal center of the machine frame, a needle-carrying assembly comprising operating mechanism slidably mounted on said hollow trunnion for sliding adjustment thereon transversely of the machine frame, and driving connections for the operating mechanism of said needle-carrier assembly housed in said hollow trunnion.

25. In a harvesting machine the combination of a machine frame, a hollow trunnion extending transversely of the machine frame, a needle-carrying assembly comprising operating mechanism slidably mounted on said hollow trunnion for sliding adjustment thereon transversely of the machine frame, and driving connections for the operating mechanism of said needle-carrying assembly housed in said trunnion, said driving connections comprising a telescopic connection with a driving member mounted directly on the machine frame.

26. In a cotton harvesting machine the combination of a revoluble picking needle carrier, picking needles rotatably mounted in said carrier, means for stripping cotton from the needles, with a cotton conveying conduit having a fan shaft therein, a peripherally toothed gear arranged to rotate said fan shaft and having a driving face thereon, a positively actuated driving member having a disk face arranged to co-operate with the driving face of said gear, a free disk lying between the co-operating faces of said gear and said driving member, and resilient means exerting a force tending to bind said free disk between said driving member and the driving face of said gear, said resilient means capable of exerting force sufficient to bind the co-operating parts in the absence of added resistance to rotation of said gear and insufficient to operatively bind the parts in the presence of any added resistance to the rotation of said gear.

27. In a cotton harvesting machine the combination of cotton picking means comprising a revoluble picking needle carrier, picking needles rotatably mounted in said carrier, means for stripping cotton from the needles, with a cotton conveying conduit having a fan shaft therein, a driven shaft, a driving member having a disk portion with a driving face thereon and a tubular portion slidably keyed to said driven shaft, a peripherally toothed gear operatively connected with said fan shaft, said gear having a hub portion rotatable on the tubular portion of said driving member and a contact face presented toward the driving face of said driving member, a free disk lying between the co-operating faces of said gear and said driving member, and resilient means exerting a force tending to bind said free disk between said driving member and the face of said gear presented theretoward, said resilient means capable of exerting force sufficient to bind the co-operating parts in the absence of added resistance to rotation of said gear and insufficient to operatively bind the parts in the presence of any added resistance to the rotation of said gear.

28. In a harvesting machine the combination of a machine frame, a hollow support extending transversely outward from the longitudinal center of the machine frame, a needle-carrier assembly comprising operating mechanism mounted on said hollow support, and driving connections for the operating mechanism of said needle-carrier assembly housed in said hollow support.

29. In a harvesting machine the combination of hollow supports extending oppositely transversely of the machine frame, needle-carrier assemblies mounted on said hollow supports, and driving connections within said hollow supports, said needle-carrier assemblies each comprising actuating mechanism operatively engaging with the driving connections in said hollow supports.

In testimony whereof I have hereunto set my hand.

LOUIS E. WIRTH.